Nov. 17, 1953         H. H. TALBOT         2,659,217
                   UNIVERSAL COUPLING
Filed Sept. 3, 1947                    2 Sheets-Sheet 1
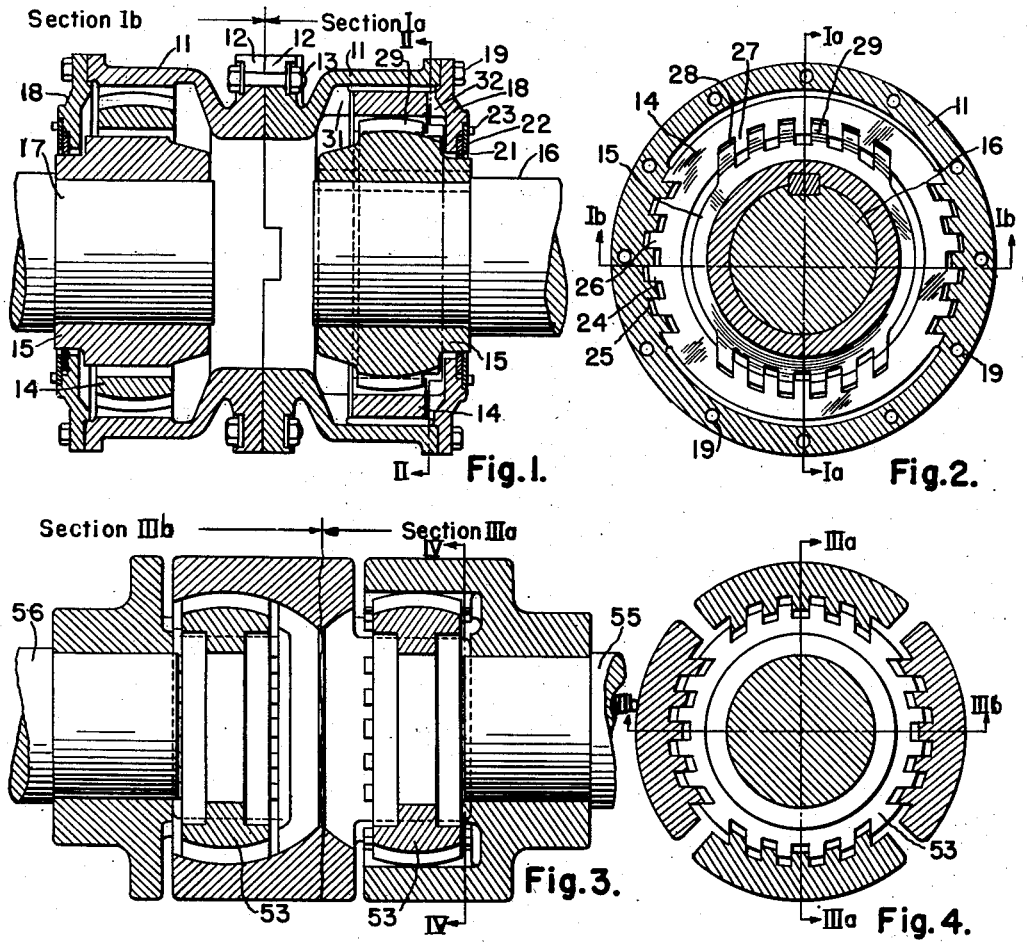
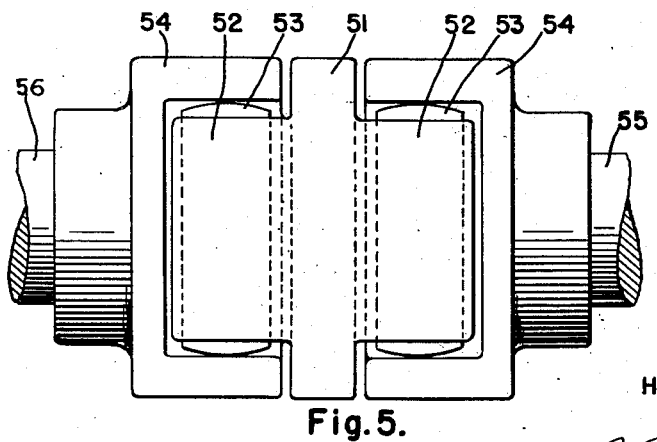
Inventor
Howard H. Talbot
By J. E. Dickinson
Attorney Nov. 17, 1953

H. H. TALBOT 2,659,217

UNIVERSAL COUPLING

Filed Sept. 3, 1947

Inventor

Howard H. Talbot

Patented Nov. 17, 1953

2,659,217

UNITED STATES PATENT OFFICE 2,659,217

UNIVERSAL COUPLING

Howard H. Talbot, Pittsburgh, Pa., assignor to United Engineering & Foundry Company, Pittsburgh, Pa., a corporation of Pennsylvania Application September 3, 1947, Serial No. 771,983

5 Claims. (Cl. 64—9)

This invention relates to a coupling and in particular to a shaft coupling of the universal type capable of transmitting a great amount of power between two shafts which are subject to considerable mis-alignment during normal rotation thereof.

It has been found that in the use of the usual types of universal couplings, particularly for transmitting power to rolling mills and the like which employ slippers for effecting universal action, when mis-alignment between the driving and driven shafts is appreciable very rapid wear of relatively moving contacting parts results due to the small areas of contact of the slippers with the supporting members, thus causing undesirable conditions of operation. Due to the lack of effective lubricating means for such couplings, it becomes necessary frequently to replace many of the elements thereof.

It is one object of this invention to provide a universal coupling, the power transmitting ability and efficiency of which is not affected by appreciable mis-alignment of the driving and driven shafts.

Another object of this invention is to provide a universal coupling capable of transmitting a great amount of torque and in which friction, wear and breakage of relatively moving contacting elements is reduced to a minimum by reason of the large areas upon which forces are imposed.

Still another object of this invention is to provide a universal coupling in which is included a most effective self-contained system of lubrication.

These, as well as the various other novel features and advantages of this invention, will become apparent from the following detailed description and accompanying drawings of which:

Figure 1 is a composite longitudinal sectional view of a universal coupling embodying the features of this invention taken at Ia—Ia and Ib—Ib of Figure 2;

Figure 2 is a sectional view taken at II—II of Figure 1;

Figure 3 is a composite sectional view of a modified universal coupling taken at IIIa—IIIa and IIIb—IIIb of Figure 4;

Figure 4 is a sectional view taken at IV—IV of Figure 3;

Figure 5 is an assembly view of the modified coupling, and

Figure 6:
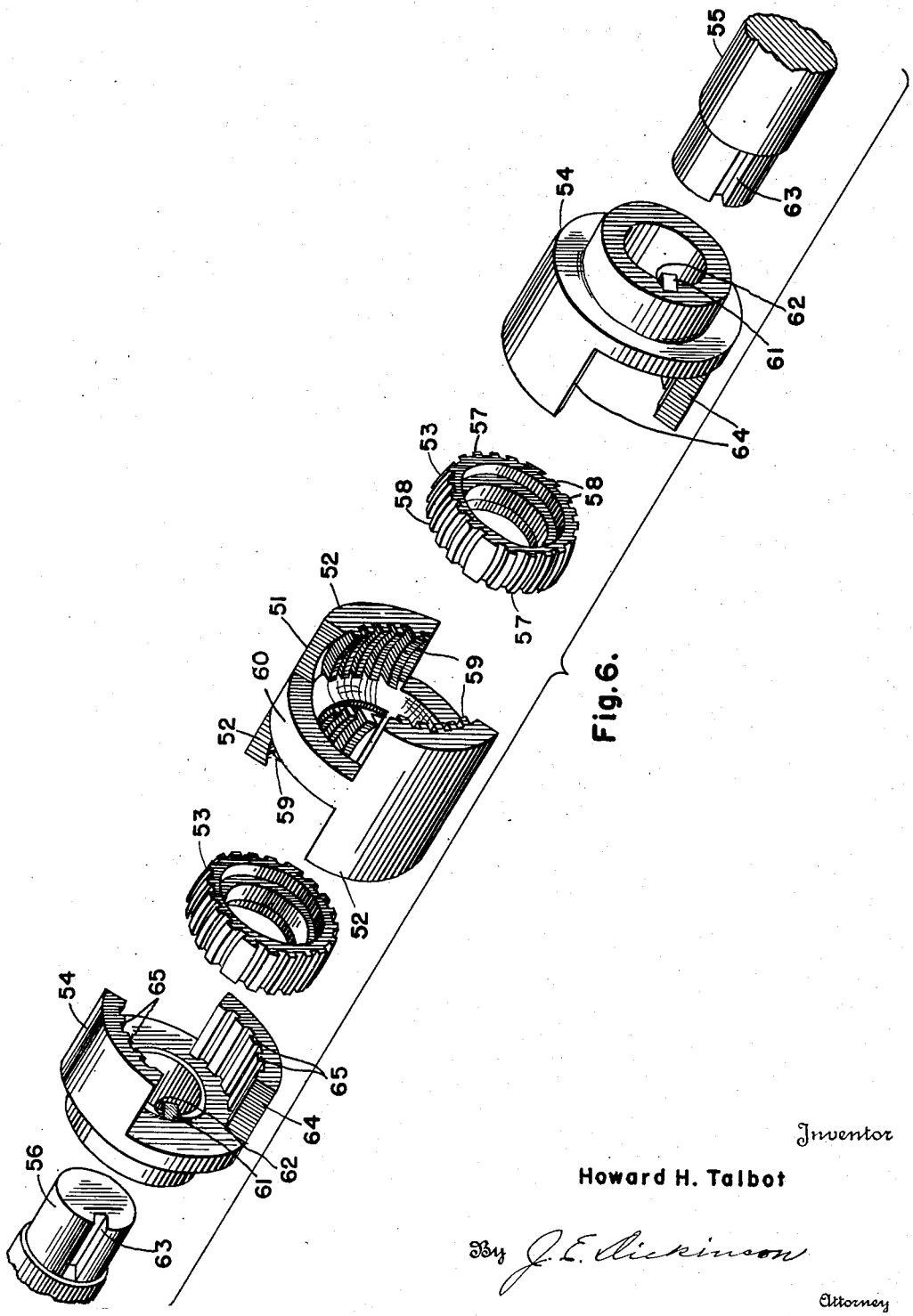
Figure 6 is an exploded isometric view of the modified coupling.

With reference to the drawings, Figures 1 and 2, the preferred type of universal coupling embodying the features of my invention comprises a pair of symmetrical casings 11, joined together at their flanges 12 by means of bolts 13, a pair of inter-engaging sleeves 14 and 15, one of the sleeves 15 keyed to the end of driving shaft 16 and the other keyed to driven shaft 17, annular cover plates 18 secured to the casings 11 by studs 19 at the outer periphery thereof, and annular seals 21 held in position by means of thin annular plates 22 secured to cover plates 18 by studs 23.

On the inner surface of casings 11 are formed a series of diametrically opposed parallel rectangular projections 24 having recesses 25 therebetween within which are received for sliding and rocking action a series of curved parallel projections 26, of a rectangular cross-section, formed on the outer surface of sleeves 14. On the inner surface of sleeves 14 in planes at right angles to the planes containing projections 26 are a series of diametrically opposed parallel rectangular projections 27, similar in shape to projections 24 and having recesses 28 therebetween within which are received for sliding and rocking action a series of curved parallel projections 29 formed at diametrically opposed points on the outer surface of sleeve 15. The curved projections 26 and 29 are portions of a sphere since they are generated from a point centrally located on the axes of rotation of sleeves 14 and 15. Retaining lugs 31 and 32 secured to the casings 11 and cover plates 18 respectively, are rounded at the surfaces wherein contact is had with outer sleeve 14 so as to permit limited movement of said sleeve to effect universal action in a direction determined by the sliding motion between contacting surfaces.

To assemble the coupling, cover plates 18, with annular plate 22 and seals 21 attached thereto, are passed over the ends of the driving and driven shafts 16 and 17 respectively, the two inner sleeves 15 keyed to the ends of the shafts, sleeves 14 positioned on sleeves 15 so that projections 26 thereof mesh with projections 29 of sleeves 15, the two casings 11 placed over the thus assembled sleeves 14 and 15 so that parallel projections 24 mesh with curved projections 26, casings 11 secured together at their flanges 12 by the bolts 13, and cover plates 18 attached to the casings 11 by bolts 23 to complete the assembly. Before the casings 11 are secured together, the voids within the casings are filled with grease or an adequate lubricating medium so that free movement of the relative moving contacting elements will be insured.

The modified form of my invention, as disclosed in Figures 3 through 6, comprises a hollow spacing member 51, within the arms 52 of which is received for sliding movement rings 53, which rings are slidably engaged by the bifurcated elements 54 secured to driving and driven shafts 55 and 56 respectively. Each ring 53, which takes the place of a pair of inter-engaging sleeves shown in the preferred embodiment of my invention, is provided with two groups of curved parallel projections 57 and 58 on the outer surface thereof, the projections being portions of a sphere since they are generated from a point centrally located on the axis of the ring.

Extending outwardly from spacing member 51 are two pairs of arms 52 having curved projections 59 on the inner surface thereof, the projections being generated as portions of a sphere on a radius slightly greater than that of the outside surface of the rings 53 from a point located on the axis of member 51 midway between the outer end of the arms 52 and the ring portion 60 of member 51. One of the rings 53, with the transverse axis thereof extending in the direction of the axis of rotation of spacing member 51, is placed within the space between each of the pair of arms 52 and, with the projections 57 thereof in position to be received by the recesses between projections 59, rotated about a transverse axis until the axes of rotation of both the spacing member 51 and ring 53 coincide, thus confining rings 53 between the arms. Each of the bifurcated elements 54, which elements are secured to the driving and driven shafts by keys received in keyways 62 and 63, is provided with a pair of arms 64 having a plurality of diametrically opposed parallel projections 65 formed on the inner surfaces thereof adapted to mesh with projections 58 of rings 53.

To assemble the modified coupling, one of the bifurcated elements 54, with the arms 64 thereof extending longitudinally outward of the shafts, is placed over the end of each of the spaced apart shafts 55 and 56, rings 53 inserted between the arms 52 with projections thereof in meshing relationship with projections 59, the two elements 54 moved toward each other until the arms 64 thereof encompass the exposed portion of rings 53 and projections 65 engage with projections 58, and the bifurcated elements 54 keyed to the shafts.

By virtue of the large number of bearing areas formed by the inter-engaging projections and by which the forces are absorbed, considerably more torque may be transmitted by the couplings embodying the features of my invention disclosed herein, as compared with couplings of the same size in use heretofore, without affecting overall size in use heretofore, without affecting the ability to function properly even though misalignment of the shafts be quite great.

According to the provisions of the patent statutes, I have explained the principle and construction of my invention and have illustrated and described what I consider to represent the best embodiment thereof. However, I desire to have it understood that within the scope of the appended claims the invention may be practiced otherwise than as specifically illustrated and described.

I claim:

1. A universal coupling for joining together two shafts comprising a casing, a plurality of diametrically opposed axially extending parallel projections, with recesses therebetween, formed within said casing and at either end thereof, a pair of sleeves having a plurality of axially extending projections on the outer surface thereof adapted to be received for slidable movement within said aforementioned recesses, oppositely disposed lugs within said casing for pivotally supporting each of said sleeves and preventing substantial axial movement thereof, a plurality of diametrically opposed axially extending projections, formed on the inner surface of said sleeves and disposed at right angles to said projections on the outer surface thereof, a second pair of sleeves positioned within said first-mentioned sleeves and having a plurality of axially extending projections on the outer surface thereof adapted to be received for slidable movement within said recesses on the inner surface of said first pair of sleeves and means for securing said second pair of sleeves to the opposed ends of said shafts being coupled together.

2. A universal coupling for joining together two shafts comprising a casing, a plurality of diametrically opposed axially extending parallel projections, with recesses therebetween, formed within said casing and at either end thereof, a pair of sleeves having a plurality of axially extending projections on the outer surface thereof adapted to be received for slidable movement within said aforementioned recesses, means engaging oppositely disposed portions of the ends of and for retaining each of said sleeves within said casing and permitting movement about an axis at right angles to the longitudinal axis thereof, a plurality of diametrically opposed axially extending projections, with recesses therebetween, formed on the inner surface of said sleeves and disposed at right angles to said projections on the outer surface thereof, a second pair of sleeves positioned within said first-mentioned sleeves and having a plurality of axially extending projections on the outer surface thereof adapted to be received for slidable movement within said recesses on the inner surface of said first pair of sleeves, and means for securing said second pair of sleeves to the opposed ends of said shafts being coupled together.

3. A universal coupling for joining together two shafts comprising a casing, a plurality of diametrically opposed axially extending parallel projections, with recesses therebetween, formed within said casing and at either end thereof, a pair of sleeves having a plurality of axially extending projections on the outer surface thereof adapted to be received for slidable movement within said aforementioned recesses, means engaging oppositely disposed portions of the ends of and for retaining each of said sleeves within said casing and permitting movement about an axis at right angles to the longitudinal axis thereof, a plurality of diametrically opposed axially extending projections, with recesses therebetween, formed on the inner surface of said sleeves extending in the same direction of and in planes disposed at right angles to said projections on the outer surface thereof, a second pair of sleeves positioned within said first-mentioned sleeves and having a plurality of axially extending projections on the outer surface thereof adapted to be received for slidable movement within said recesses on the inner surface of said first pair of sleeves, and means for securing said second pair of sleeves to the opposed ends of said shafts being coupled together.

4. In a universal coupling, a casing, a plurality of diametrically opposed axially extending parallel projections, with recesses therebetween, formed within said casing, a sleeve having a plurality of axially extending projections on the outer surface thereof adapted to be received for slidable movement within said aforementioned recesses, means engaging oppositely disposed portions of the ends of and for retaining said sleeve within said casing and permitting limited movement about a transverse axis thereof, a plurality of diametrically opposed axially extending projections, with recesses therebetween, formed on the inner surface of said sleeve, extending in the same direction of and in planes disposed at right angles to said projections on the outer surface thereof, and a sleeve positioned within said first-mentioned sleeve and having a plurality of axially extending projections on the outer surface thereof adapted to be received for slidable movement within said recesses on the inner surface of said first-mentioned sleeve.

5. A universal coupling for joining together two shafts comprising a sealed casing within which a lubricant is confined, a plurality of diametrically opposed axially extending parallel projections, with recesses therebetween, formed within said casing at either end thereof, a pair of sleeves having a plurality of axially extending projections on the outer surface thereof adapted to be received for slidable movement within said aforementioned recesses, means engaging oppositely disposed portions of the ends of and for retaining each of said sleeves within said casing and permitting movement about a transverse axis thereof, a plurality of diametrically opposed axially extending projections, with recesses therebetween, formed on the inner surface of said sleeves extending in the same direction of and in planes disposed at right angles to said projections on the outer surface thereof, a second pair of sleeves positioned within said first mentioned sleeves and having a plurality of axially extending projections on the outer surface thereof adapted to be received for slidable movement within said recesses on the inner surface of said first pair of sleeves, and means for securing said second pair of sleeves to the opposed ends of said shafts being coupled together.

HOWARD H. TALBOT.

References Cited in the file of this patent

UNITED STATES PATENTS

| Number | Name | Date |
|---|---|---|
| 1,310,239 | Johnson | July 15, 1919 |
| 1,494,465 | Dunn et al. | May 20, 1924 |
| 1,835,684 | Williams | Dec. 8, 1931 |
| 2,303,813 | Barcus | Dec. 1, 1942 |

FOREIGN PATENTS

| Number | Country | Date |
|---|---|---|
| 811,979 | France | Apr. 27, 1937 |